US009342113B2

(12) United States Patent
Matas (10) Patent No.: US 9,342,113 B2
(45) Date of Patent: May 17, 2016

(54) MOVEMENT-TRIGGERED ACTION FOR MOBILE DEVICE (71) Applicant: Facebook, Inc., Menlo Park, CA (US)

(72) Inventor: Michael Matas, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 28 days.

(21) Appl. No.: 13/945,837

(22) Filed: Jul. 18, 2013

(65) Prior Publication Data

US 2015/0022434 A1    Jan. 22, 2015

(51) Int. Cl.
*G06F 3/0346* (2013.01)
*G06F 1/16* (2006.01)
*G06F 3/01* (2006.01)
*G06F 3/038* (2013.01)

(52) U.S. Cl.
CPC .............. *G06F 1/1694* (2013.01); *G06F 3/017* (2013.01); *G06F 3/0346* (2013.01); *G06F 3/0383* (2013.01)

(58) Field of Classification Search
CPC .............. G06F 1/1694; G06F 3/0346–3/0354; G06F 2200/1637
See application file for complete search history.

(56) References Cited

U.S. PATENT DOCUMENTS

| | | | |
|---|---|---|---|
| 2005/0212760 A1* | 9/2005 | Marvit et al. | 345/156 |
| 2010/0171691 A1* | 7/2010 | Cook et al. | 345/156 |
| 2011/0025901 A1* | 2/2011 | Tsubusaki | 348/333.12 |
| 2011/0117970 A1* | 5/2011 | Choi | 455/566 |
| 2012/0036485 A1* | 2/2012 | Watkins et al. | 715/863 |
| 2012/0147047 A1 | 6/2012 | Kim | |
| 2013/0053007 A1* | 2/2013 | Cosman et al. | 455/414.3 |
| 2013/0104090 A1* | 4/2013 | Yu | G06F 3/0487 715/863 |
| 2013/0137483 A1 | 5/2013 | Senoo | |
| 2013/0324152 A1* | 12/2013 | Lee et al. | 455/456.1 |
| 2013/0335219 A1* | 12/2013 | Malkowski | G08B 13/22 340/539.22 |
| 2014/0171068 A1* | 6/2014 | Marti et al. | 455/427 |

FOREIGN PATENT DOCUMENTS

EP    1568966 A2    8/2005

OTHER PUBLICATIONS

International Search Report and Written Opinion for International Application PCT/US2014/047119, Nov. 13, 2014.

* cited by examiner

*Primary Examiner* — Kumar Patel
*Assistant Examiner* — Amy C Onyekaba
(74) *Attorney, Agent, or Firm* — Baker Botts, L.L.P.

(57) ABSTRACT

In one embodiment, a method includes, by a computing device, receiving sensor data from a sensor on the computing device indicating physical movement of the computing device. The method also includes determining a motion-trigger signal of the sensor data corresponding to a first characteristic of the physical movement of the computing device and a motion-confirm signal of the sensor data corresponding to a second characteristic of the physical movement of the computing device. The method further includes determining whether the motion-trigger signal includes a transition from within a pre-defined threshold band to outside of the pre-defined threshold band and whether the motion-confirm signal is within the pre-defined threshold band. The method also includes initiating a pre-defined action of the computing device when the motion-trigger signal includes the transition from within the pre-defined threshold band to outside the pre-defined threshold band and the motion-confirm signal is within the pre-defined threshold band.

20 Claims, 6 Drawing Sheets

MOVEMENT-TRIGGERED ACTION FOR MOBILE DEVICE

TECHNICAL FIELD

This disclosure generally relates to mobile computing devices.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a mobile computing device may determine that the device is undergoing a physical movement based on data from one or more motion sensors in the device. The motion sensors may include an accelerometer, gyroscope, or magnetometer, or any suitable combination thereof. If the sensor data meets certain criteria, the mobile computing device may initiate a pre-defined action. For example, the mobile computing device may be a smartphone displaying an image on its display screen, and when a certain physical movement of the smartphone is sensed the pre-defined action may include zooming into or out of the image. The physical movement may include a motion where the smartphone may be held in a user's hand and "flicked" toward or away from the user in a rapid, jolting motion, and the flick movement may include translational motion along the vertical or longitudinal axis of the smartphone or a pitching rotational motion of the smartphone. The physical movement may be recognized by incorporating data from a gyroscope or an accelerometer and weighting the data according to the characteristics of the physical movement. Moreover, a low-pass filter may be applied to the sensor data to reduce noise caused by hand tremors or spurious mechanical movements or vibrations.

In particular embodiments, to avoid unintentionally initiating an action, the mobile computing device may "lock out" the initiation of the action if certain other physical movements are sensed. For example, a flick movement may be recognized when there is (1) a translational movement along the vertical or longitudinal axis of the device or a pitching rotational motion and (2) a relatively small amount of rolling or yawing movement. When an excessive amount of roll or yaw is sensed, the device may prevent, or lock out, the initiation of the action.

In particular embodiments, the mobile computing device may monitor sensor data, predict a likelihood of completion of a physical movement based on the sensor data, and then partially initiate the corresponding action when the prediction attains a threshold likelihood of completion. Completion of the corresponding action may occur after the physical movement has been completed. If the physical movement is not completed within a threshold period of time, the corresponding action may be revoked. For example, if the mobile computing device detects a 51% likelihood of a flick movement while monitoring sensor data, the device may commence scaling an image displayed on a screen to zoom in by 50%. If the flick hand gesture is completed within a pre-defined period of time, such as 300 ms, the zoom-in action will be completed to 100%; but if not, the image will be scaled back to its original size.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

Figure 1:
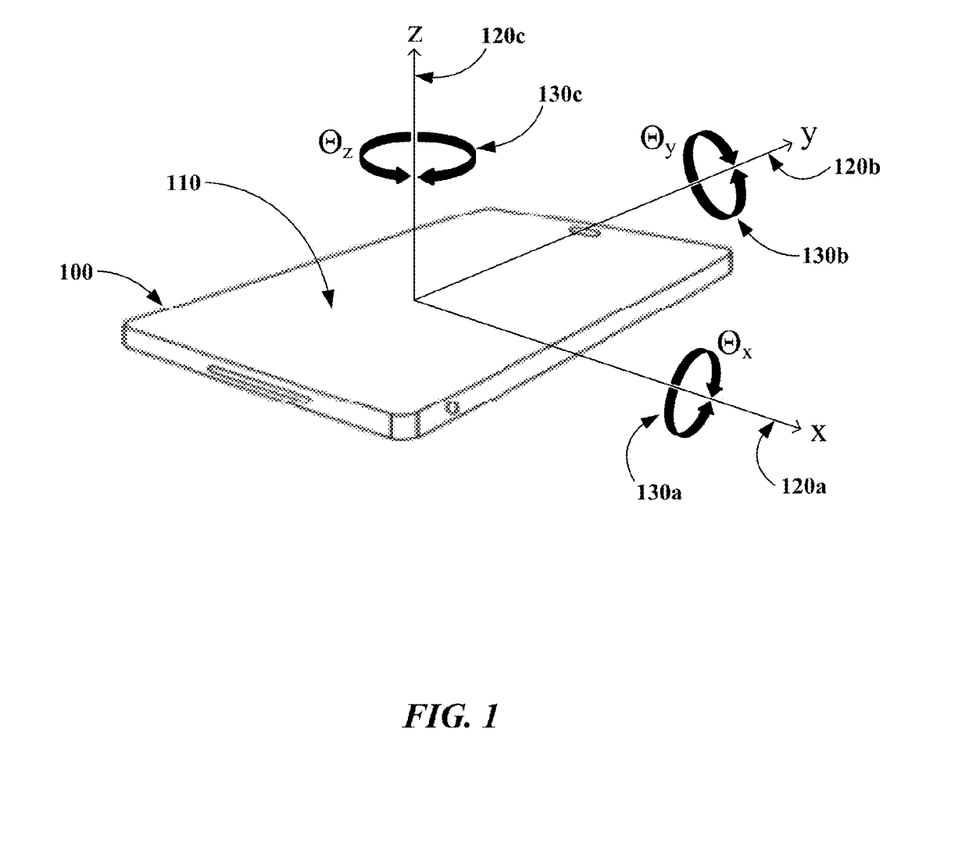
FIG. 1 illustrates an example mobile computing device with example axes.

FIG. 1 illustrates an example mobile computing device 100 having a front surface 110. In particular embodiments, mobile computing device 100 may be a single-board computer (SBC) (such as, for example, a computer-on-module (COM) or system-on-module (SOM)), a laptop or notebook computer, a mobile telephone, a smartphone, a personal digital assistant (PDA), a tablet computer system, or a combination of two or more of these. Mobile computing device 100 may include one or more integrated display screens or an interface to one or more external display screens. Front surface 110 of mobile computing device 100 may include a display screen. This disclosure contemplates any suitable mobile computing device 100 taking any suitable physical form.

FIG. 1 illustrates example translational axes 120 for characterizing translational movement of mobile computing device 100 and example rotational axes 130 for characterizing rotational movement of mobile computing device 100. A physical movement of mobile computing device 100 may include a rotational or translational displacement, velocity, acceleration, or any other suitable higher-order characteristic of motion, or any suitable combination thereof X-axis 120a, which may be referred to as the lateral axis, and Y-axis 120b, which may be referred to as the longitudinal axis, may be orthogonal to each other and may lie in the plane of front surface 110. Z-axis 120c, which may be referred to as the vertical axis, may be orthogonal to front surface 110. $\Theta_x$-axis 130a, which may be referred to as the pitch axis, may be used to characterize pitching, or the rotational movement of mobile computing device 100 about X-axis 120a. $\Theta_y$-axis 130b, which may be referred to as the roll axis, may be used to characterize rolling, or the rotational movement of mobile computing device 100 about Y-axis 120b. $\Theta_z$-axis 130c, which may be referred to as the yaw axis, may be used to characterize yawing, or the rotational movement of mobile computing device 100 about Z-axis 120c. Although this disclosure describes or illustrates particular axes for describing position, orientation, or movement of mobile computing device 100, this disclosure contemplates any suitable axes having any suitable orientations. Although this disclosure describes or illustrates particular physical movements of mobile computing device 100, including rotational or translational displacement, velocity, or acceleration, this disclosure contemplates any suitable movements or combinations of suitable movements, including any suitable higher-order characteristics of motion, such as jerk or jounce.

In particular embodiments, mobile computing device 100 may include one or more types of sensors for detecting position, orientation, translational movement, or rotational movement of mobile computing device 100. The motion sensors may include an accelerometer, gyroscope, or magnetometer, or any suitable combination thereof. Mobile computing device 100 may also include an interface to one or more external sensors for detecting position or movement. Although this disclosure describes particular sensors for detecting position, orientation, or movement of mobile computing device 100, this disclosure contemplates any suitable sensors for detecting position, orientation, or movement.

In particular embodiments, an accelerometer may be used to determine the translational movement of mobile computing device 100 along any of translational axes 120. For example, the accelerometer sensor data may be used to determine the linear acceleration of mobile computing device 100 along axes 120. Moreover, integrating (or averaging) the accelerometer data over a particular time interval may be used to determine the velocity of mobile computing device 100 along axes 120. Other higher-order characteristics of translational motion of mobile computing device 100 along axes 120 may be determined by taking one or more derivatives with respect to time of the accelerometer data. In particular embodiments, a derivative signal may be obtained by calculating the difference between sensor data obtained at two different times.

In particular embodiments, a gyroscope may be used to determine orientation or rotational movement of mobile computing device 100 along any of rotational axes 130. For example, the gyroscope sensor data may be used to determine the angular orientation of mobile computing device 100 along axes 130. By taking the first derivative with respect to time of the gyroscope data, the rotational (or angular) velocity of mobile computing device 100 along axes 130 may be determined. The second derivative of the gyroscope data may be used to determine the rotational (or angular) acceleration of mobile computing device 100 along axes 130. Taking additional higher-order derivatives may be used to determine additional higher-order characteristics of rotational motion of mobile compute device 100 along axes 130.

In particular embodiments, a magnetometer (e.g., a magnetic field sensor) may be used to measure orientation or rotational movement of mobile computing device 100 along any of rotational axes 130. The magnetometer may sense the earth's magnetic field or any other suitable, substantially static magnetic field to determine the angular orientation of mobile computing device 100. By taking the first derivative with respect to time of the magnetometer data, the rotational velocity of mobile computing device 100 along axes 130 may be determined. The second derivative of the magnetometer data may be used to determine the rotational acceleration of mobile computing device 100 along axes 130.

Figure 2A:
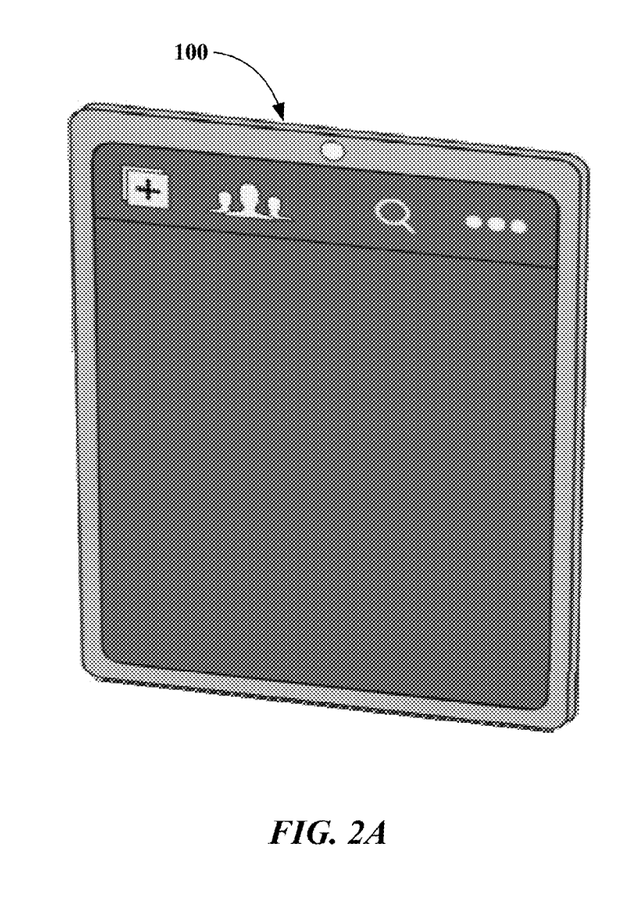
FIGS. 2A-2B illustrate an example mobile computing device undergoing an example movement.
Figure 2B:
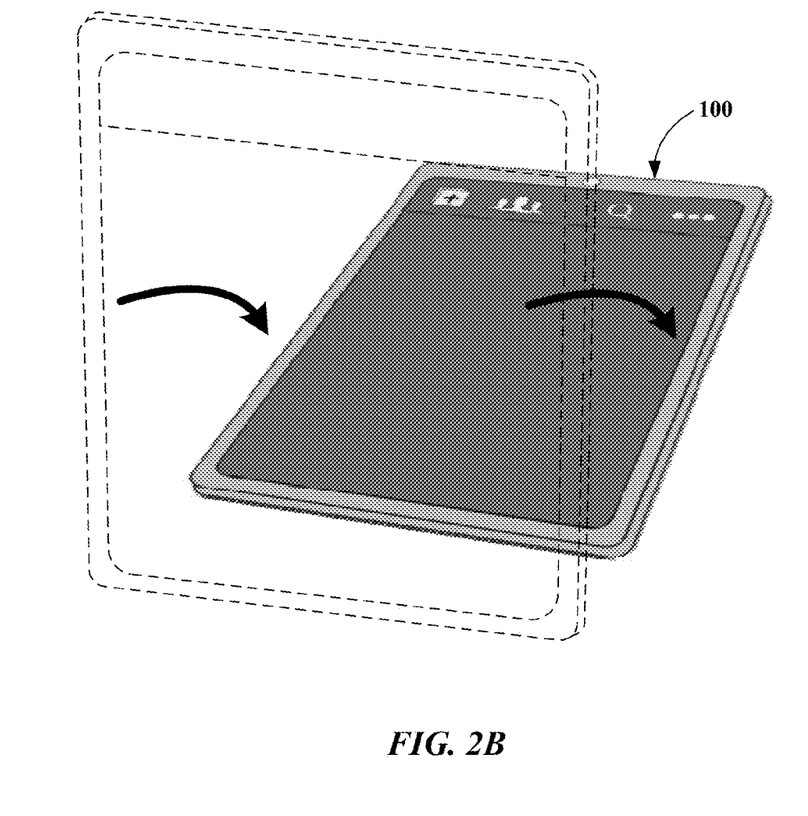

FIGS. 2A-2B illustrate an example mobile computing device 100 undergoing an example physical movement. FIG. 2A illustrates mobile computing device 100 oriented in a substantially upright position. FIG. 2B illustrates mobile computing device 100 after undergoing a physical movement as indicated by the arrows, where the movement may include a translational movement or a rotational movement. The original position of mobile computing device 100 from FIG. 2A is indicated by a dashed outline in FIG. 2B. In particular embodiments, mobile computing device 100 may be held in a user's hand while undergoing a physical movement as illustrated in FIGS. 2A and 2B. In particular embodiments, a physical movement may include a motion where mobile computing device 100 is held in a user's hand and "flicked" away from the user in a rapid, jolting motion. A flick movement may include a displacement, velocity, or acceleration along Z-axis 120c (e.g., perpendicular to front surface 110); a displacement, velocity, or acceleration along Y-axis 120b (the longitudinal axis); or a pitching rotational displacement, velocity, or acceleration along $\Theta_x$-axis 130a. Moreover, relative to the previously recited movements, a flick movement may include only a small component of the following: displacement, velocity, or acceleration along X-axis 120a (the transverse axis); rolling rotational displacement, velocity, or acceleration along $\Theta_y$-axis 130b; or yawing rotational displacement, velocity, or acceleration along $\Theta_z$-axis 130c.

In particular embodiments, a physical movement may include a motion where mobile computing device 100 is held in a user's hand and flicked toward the user. In particular embodiments, a physical movement may include a lateral motion along X-axis 120a where mobile computing device 100 is moved sideways. In particular embodiments, a physical movement may include a twisting motion where mobile computing device 100 undergoes a rolling rotation motion along $\Theta_y$-axis 130b or a yawing rotational motion along $\Theta_x$-axis 130c. In particular embodiments, a physical movement may include a translational movement along any of axes 120 or a rotational movement along any of axes 130, or any suitable combination of movements along any suitable axes. Although this disclosure describes or illustrates particular physical movements along particular axes, this disclosure contemplates any suitable physical movements or any suitable combination of physical movement along any suitable axes.

Figure 3:
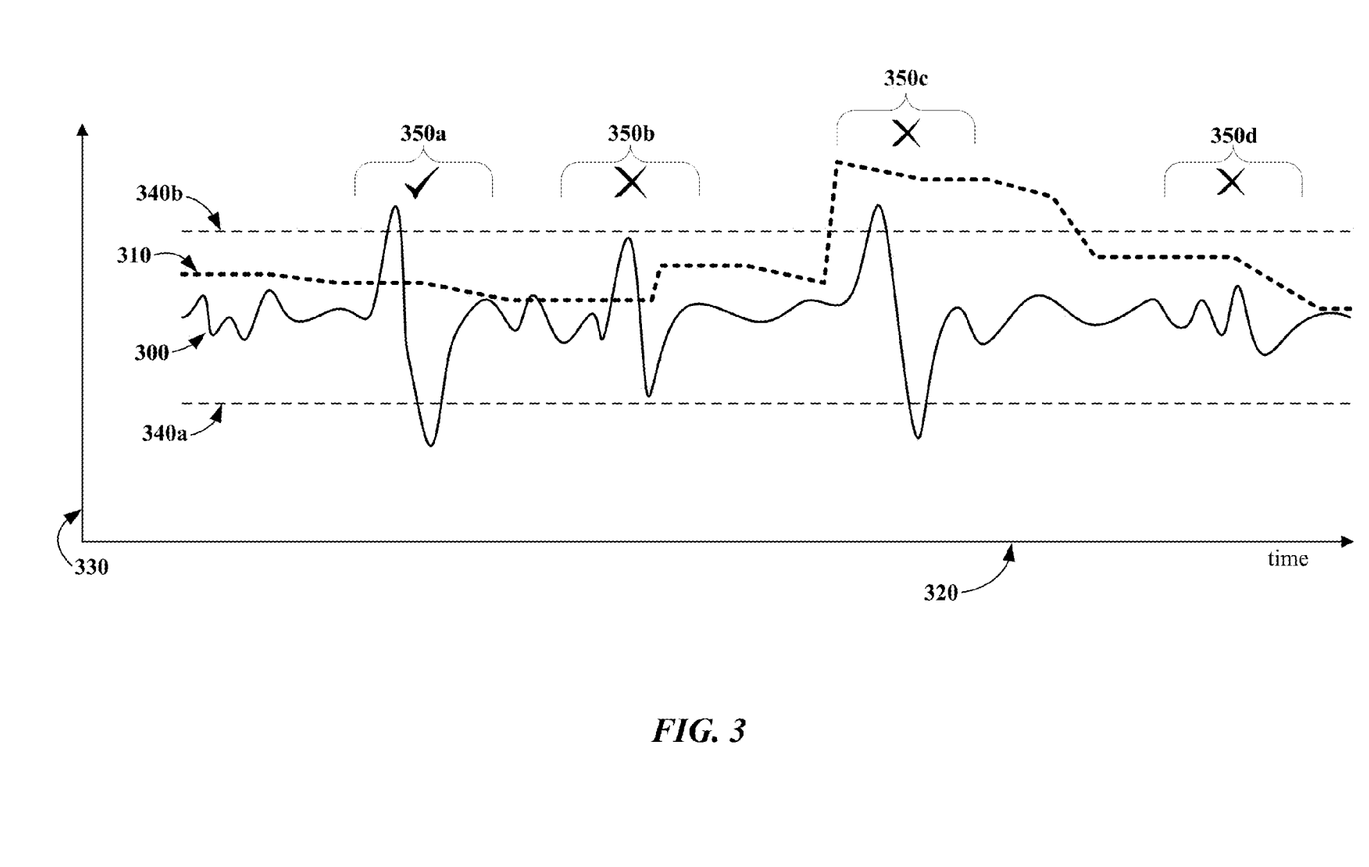
FIG. 3 illustrates example signals computed from sensor data.

FIG. 3 illustrates example signals 300 and 310 computed from sensor data of one or more sensors on mobile computing device 100. Example sensor signals 300 and 310 may be in the form of a time-varying magnitude where time is indicated by horizontal axis 320 and sensor-signal magnitude is indicated by vertical axis 330. A pre-defined threshold band 340 may be represented by horizontal dashed lines 340a and 340b, where line 340a indicates a lower limit and line 340b indicates an upper limit of threshold band 340. In particular embodiments, sensor signal 300 may be defined as a motion-trigger signal, and sensor signal 310 may be defined as a motion-confirm signal.

A motion-trigger signal 300 may be a measure of a first physical movement of mobile computing device 100 potentially indicating user input intended by the user to trigger an action, and it may include unprocessed sensor data from one or more sensors, sensor data from one or more sensors multiplied by a scaling or weighting factor, sensor data processed by a low-pass filter, or other suitable processed or unprocessed sensor data. A motion-confirm signal 310 may provide a contraindication of a motion-trigger signal 300. For example, a motion-confirm signal 310 may be a measure of a second physical movement of mobile computing device 100 potentially indicating that the user did not intend to trigger an action, and similar to a motion-trigger signal it may include unprocessed sensor data from one or more sensors, sensor data from one or more sensors multiplied by a scaling or weighting factor, sensor data processed by a low-pass filter, or other suitable processed or unprocessed sensor data. For example, for a particular physical movement of mobile computing device 100, motion-trigger signal 300 may correspond to one characteristic of the physical movement, and motion-confirm signal 310 may correspond to a second characteristic of the physical movement. For example, motion-trigger signal 300 may correspond to movement that may be expected to occur and motion-confirm signal 310 may correspond to movement that may not be expected to occur in a significant amount during the particular physical movement.

In particular embodiments, as described above, the physical movement may include a motion where mobile computing device 100 is held in a user's hand and flicked away from the user. In the example of a flick movement, motion-trigger signal 300 may be computed from data of one or more sensors, including, by way of example and not limitation, displacement, velocity, or acceleration along Z-axis 120c (i.e., perpendicular to front surface 110); displacement, velocity, or acceleration along Y-axis 120b (the longitudinal axis); or a pitching rotational displacement, velocity, or acceleration along $\Theta_x$-axis 130a. Moreover, motion-trigger signal 300 may be computed by weighting data from one or more sensors in order to closely match motion-trigger signal 300 with the expected first characteristic of the physical movement. For example, in particular embodiments, motion-trigger signal 300 may be computed as follows: $MTS = a \cdot A_z + b \cdot A_y$, where MTS is motion-trigger signal 300, a and b are weighting (or scaling) factors, and $A_z$ and $A_y$ are the acceleration along Z-axis 120c and Y-axis 120b, respectively. In the example of a flick movement, motion-confirm signal 310 may be computed from data of one or more sensors, including, by way of example and not limitation, displacement, velocity, or acceleration along X-axis 120a (the transverse axis); rolling rotational displacement, velocity, or acceleration along $\Theta_y$-axis 130b; or yawing rotational displacement, velocity, or acceleration along $\Theta_z$-axis 130c. Moreover, motion-confirm signal 310 may be computed by weighting data from one or more sensors in order to closely match motion-trigger signal 310 with the expected second characteristic of the physical movement. For example, in particular embodiments, motion-confirm signal 310 may be computed as follows: $MCS = c \cdot \beta_y + d \cdot \beta_z$, where MCS is motion-confirm signal 310, c and d are weighting (or scaling) factors, and $\beta_y$ and $\beta_z$ are the angular orientation along $\Theta_y$-axis 130b and $\Theta_z$-axis 130c, respectively. In particular embodiments, a low-pass filter may be applied to sensor data, motion-trigger signal 300, or motion-confirm signal 310 to reduce noise caused by hand tremors or spurious mechanical movements or vibrations. Although this disclosure describes particular motion-trigger signals 300 and motion-confirm signals 310, this disclosure contemplates any suitable motion-trigger and motion-confirm signals.

In particular embodiments, mobile computing device 100 may determine that the device is undergoing a particular physical movement based on motion-trigger signal 300 and motion-confirm signal 310. If motion-trigger signal 300 and motion-confirm signal 310 meet certain criteria, mobile computing device 100 may initiate a pre-defined action. A pre-defined action of mobile computing device 100 may be any suitable function, task, or operation that mobile computing device 100 is configured to perform, where appropriate. For example, mobile computing device 100 may be a smartphone displaying an image on its display screen, and when the smartphone is flicked away from the user, the smartphone may zoom in on the image. If the smartphone is flicked away from the user again, the smartphone may zoom out of the image to display it in its original size. In this example embodiment, the pre-defined action initiated by mobile computing device 100 may include zooming into or out of an image. Other example actions that may be initiated by mobile computing device 100 in response to a particular physical movement may include, by way of example and not limitation, answering or ending a phone call; increasing or decreasing a speaker volume; switching between applications; increasing or decreasing a display brightness; waking mobile computing device 100 from a sleep state; or putting mobile device 100 into a sleep state. Although this disclosure describes or illustrates particular pre-defined actions that may be initiated by a mobile computing device 100 in response to a physical movement, this disclosure contemplates any suitable pre-defined actions.

In particular embodiments, the criteria where mobile computing device 100 determines whether to trigger, or initiate, a pre-defined action may include motion-trigger signal 300 making one or more transitions from within threshold band 340 to outside of threshold band 340. In the example of a flick movement, mobile computing device 100 may undergo a rapid translational acceleration followed by a rapid translational deceleration, and motion-trigger signal 300 may exhibit a corresponding rapid increase to a positive peak followed by a rapid decrease to a negative peak. Such an example flick movement is exhibited by signal portion 350a in FIG. 3. In particular embodiments, to avoid unintentionally initiating an action, mobile computing device 100 may "lock out" an initiation of an action if certain other physical movements, represented by motion-confirm signal 310, are sensed. For example, the criteria where mobile computing device 100 determines whether to initiate an action may also include motion-confirm signal 310 being located within threshold band 340. As discussed above, motion-confirm signal 310 may depend on angular orientation along $\Theta_y$-axis 130b (e.g., roll) and $\Theta_z$-axis 130c (e.g., yaw). When a rolling or yawing motion is sensed, motion-confirm signal 310 may increase or decrease, and if an excessive amount of roll or yaw is sensed, motion-confirm signal 310 may exceed the limits of threshold band 340. If motion-confirm signal 310 exceeds the limits of threshold band 340, mobile computing device 100 may prevent, or lock out, the initiation of the action.

In FIG. 3, signal portion 350a shows example motion-trigger signal 300 exhibiting a positive peak that includes a transition from within threshold band 340 to outside of threshold band 340 and a negative peak that includes a transition from within to outside of threshold band 340. Moreover, signal portion 350a shows that example motion-confirm signal 310 is within threshold band 340. In this example, signal portion 350a corresponds to a flick movement without an excessive amount of roll or yaw motion, and so, mobile computing device 100 may initiate a pre-defined action, as indicated by a check mark labeling signal portion 350a. Signal portions 350b, 350c, and 350d in FIG. 3 are labeled with an "X" mark indicating a lock-out condition where mobile computing device 100 may not initiate a pre-defined action. In signal portion 350b, motion-trigger signal 300 exhibits a positive and a negative peak but does not make a transition from within to outside of threshold band 340, indicating that a flick-type movement may have occurred but was not strong enough to trigger an action. In signal portion 350c, motion-trigger signal 300 indicates a flick movement has occurred, but motion-trigger signal 310 is located outside threshold band 340, indicating an excessive amount of other physical movement. And so, in signal portion 350c, mobile computing device 100 may not initiate a pre-defined action. In signal portion 350d, motion-trigger signal 300 indicates some physical movement, but the amplitude and shape of motion-trigger signal 300 do not correspond to the pre-defined expected movement that triggers an action. So, for signal portion 350d, no action may be triggered by mobile computing device 100.

In particular embodiments, mobile computing device 100 may apply a peak-hold function to motion-confirm signal 310, where a maximum value of motion-confirm signal 310 is made to persist for a pre-defined period of time. For example, if a sudden or spurious physical movement of mobile computing device 100 occurs, such as dropping the device, motion-confirm signal 310 may suddenly spike up to an elevated value outside of threshold band 340 and then recover to a value inside threshold band 340. A peak-hold function applied to motion-confirm signal 310 may keep motion-confirm signal 310 at the elevated value for a certain period of time, such as 200 ms, after the sudden physical movement has ceased. Over this time period, an action lock-out condition will persist so that an action cannot be initiated. Applying a peak-hold function to motion-confirm signal 310 may prevent the triggering of an action by certain unintentional or spurious physical movements.

In particular embodiments, mobile computing device 100 may monitor sensor signals 300 and 310 and predict a likelihood (or probability) of completion of a physical movement, and then partially initiate the corresponding action when the prediction attains a threshold likelihood of completion. Completion of the corresponding action may occur after the physical movement has been completed. If the physical movement is not completed within a certain period of time, the corresponding action may be revoked. For example, if mobile computing device 100 detects a 51% likelihood of a flick movement while monitoring sensor signals, device 100 may partially initiate an action, such as scaling an image displayed on a screen to zoom in by 50%. If the flick movement is completed within a pre-defined period of time, such as 300 ms, the zoom-in action will be completed to 100%; but if not, the image will be scaled back to its original size.

In particular embodiments, the speed with which an action is performed by mobile computing device 100 may be affected by the size (or amplitude) of motion-trigger signal 300. For an example action where a physical motion initiates zooming into or out of an image, the speed with which the image-zoom action occurs may be proportional to the size of motion-trigger signal 300. For example, if a user makes a flick movement that occurs relatively slowly, the image may be zoomed into at a relatively slow speed. Alternately, if a user makes a flick movement that occurs relatively quickly, zooming into the image may also occur relatively quickly. In another example embodiment, the amount of an action performed by mobile computing device 100 may be affected by the size of motion-trigger signal 300. For an example where a physical movement triggers an audio volume adjustment of mobile computing device 100, if a user makes a slow flick movement, the volume may be increased or decreased by a relatively small increment. And if a user makes a quick flick movement, the volume may be increased or decreased by a relatively large increment.

In particular embodiments, one or more distinct physical movements may initiate one or more corresponding distinct actions by mobile computing device 100. For example, a flick movement may initiate one action, such as zooming into or out of an image, and a rolling movement may initiate some other action, such as audio volume adjustment. This disclosure contemplates any suitable number of suitable physical movements that may be used to initiate any suitable number of corresponding actions by a mobile computing device 100.

Figure 4:
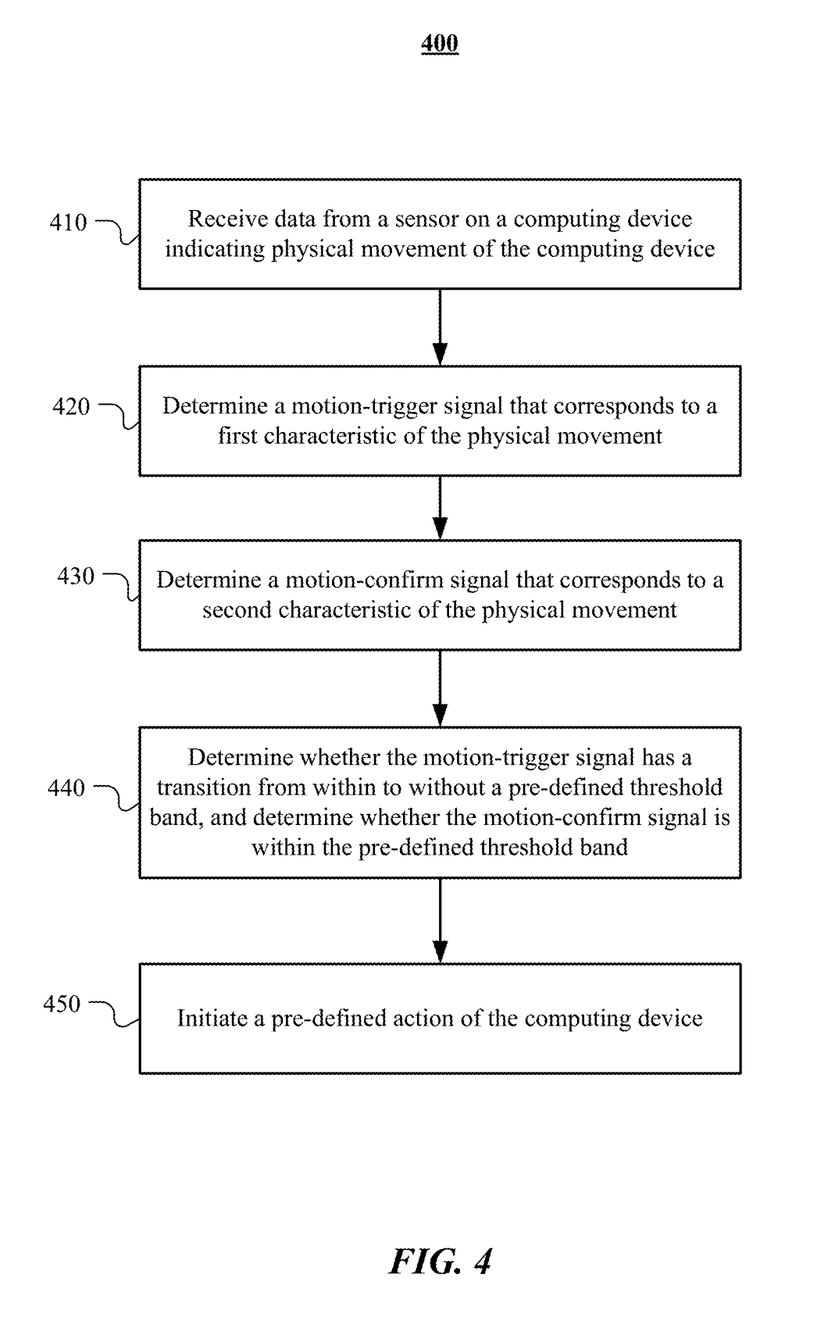
FIG. 4 illustrates an example method for determining a physical movement and initiating an action of a mobile computing device.

FIG. 4 illustrates an example method 400 for determining a physical movement of a mobile computing device 100 and initiating an action of mobile computing device 100. The method may begin at step 410, where data from a sensor on mobile computing device 100 may be received, and where the data may indicate physical movement of mobile computing device 100. At step 420 a motion-trigger signal 300 that corresponds to a first characteristic of the physical movement may be determined. At step 430 a motion-confirm signal 310 that corresponds to a second characteristic of the physical movement may be determined. At step 440 it may be determined whether motion-trigger signal 300 has a transition from within to outside of a pre-defined threshold band 340 and whether motion-confirm signal 310 is within pre-defined threshold band 340. At step 450 a pre-defined action of mobile computing device 100 may be initiated, at which point the method may end. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for determining a physical movement of a mobile computing device 100 and initiating an action of mobile computing device 100, including the particular steps of the method of FIG. 4, this disclosure contemplates any suitable method for determining a physical movement of mobile computing device 100 and initiating an action of mobile computing device 100, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5A:
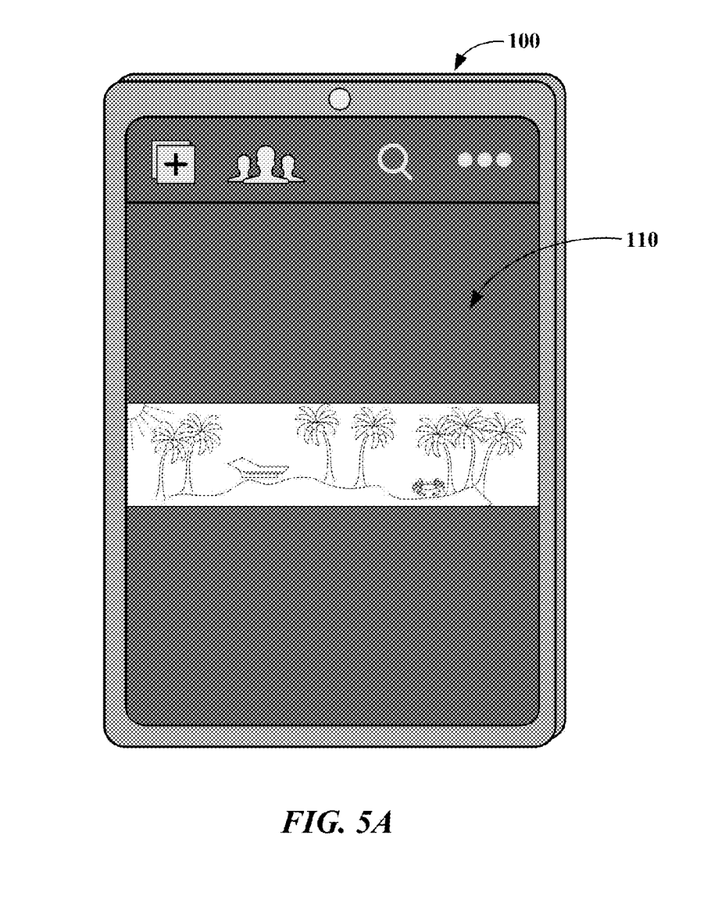
FIGS. 5A-5B illustrate an example mobile computing device undergoing an example movement that initiates an example action of zooming into an image.
Figure 5B:
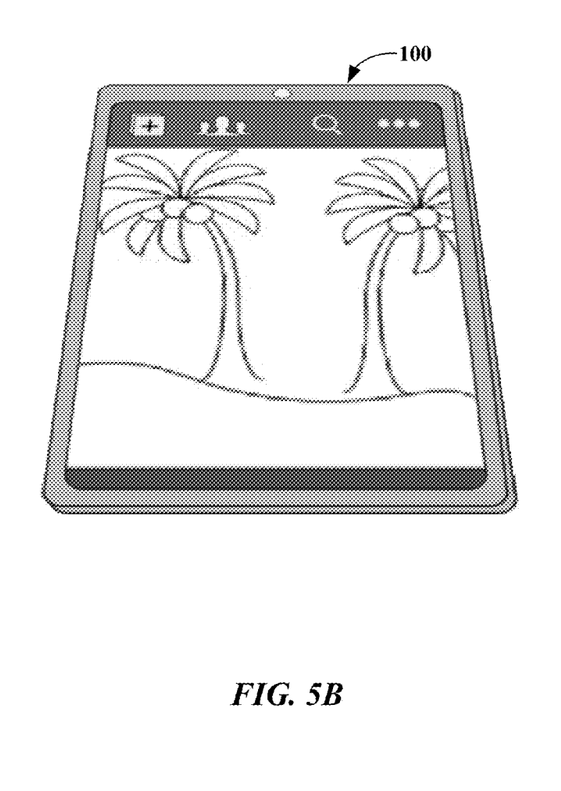

FIGS. 5A-5B illustrate an example mobile computing device 100 undergoing an example flick movement that initiates an example action of zooming into an image. In FIG. 5A, mobile computing device 100 is oriented in a substantially upright position and has a display screen included on its front surface 110. An image may be displayed on the display screen, and in particular embodiments, a flick movement of mobile computing device may initiate an action of zooming into the image. FIG. 5B shows mobile computing device 100 after undergoing a flick movement with a zoomed-in portion of the image from FIG. 5A displayed on the screen.

Figure 6:
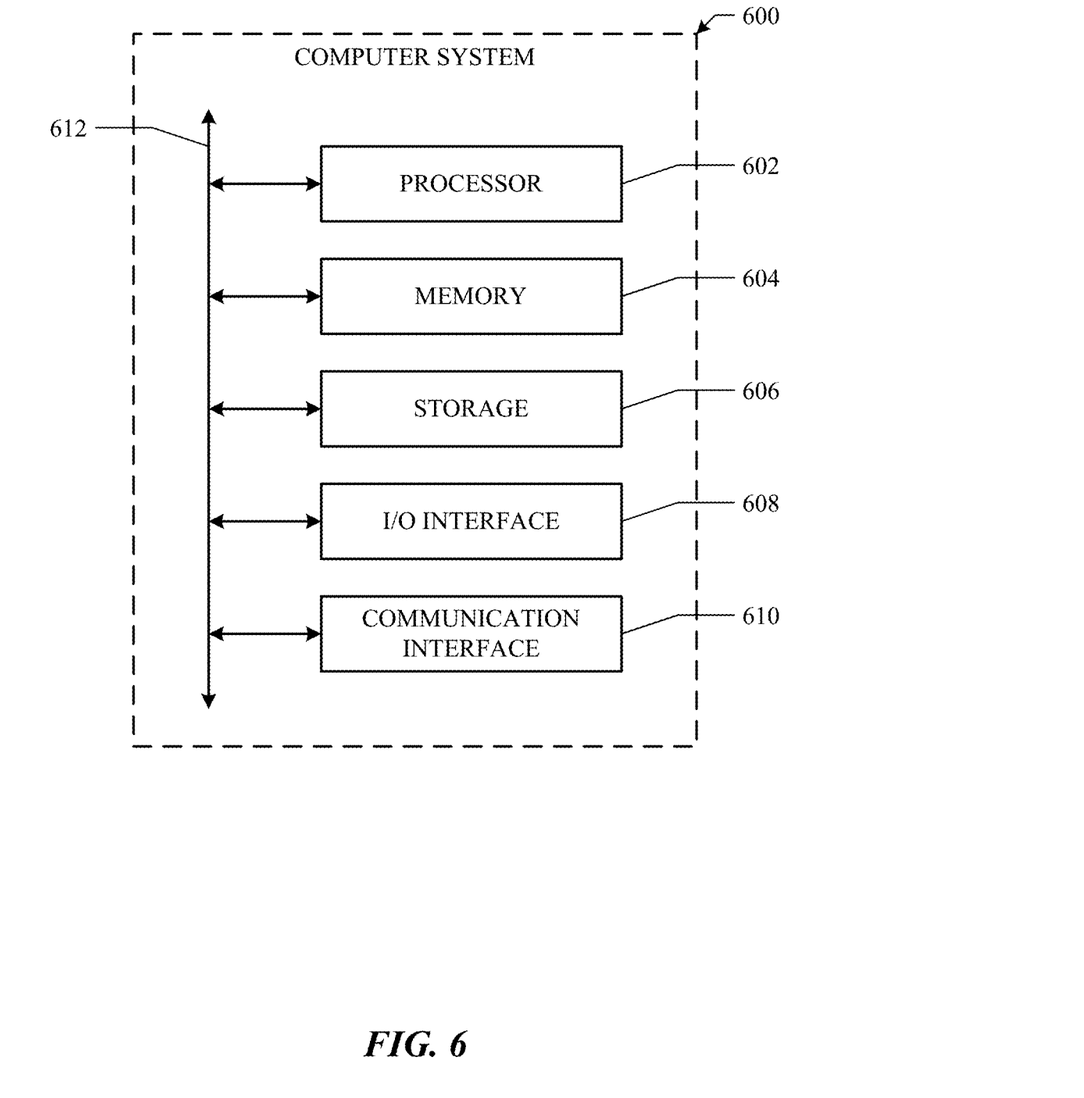
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by a computing device, receiving sensor data from a sensor on the computing device indicating physical movement of the computing device over a period of time;
by the computing device, determining, based on the sensor data, two contemporaneous signals comprising:
a motion-trigger signal corresponding to a first characteristic of the physical movement of the computing device; and
a motion-confirm signal corresponding to a second characteristic of the physical movement of the computing device;
by the computing device, determining whether:
the motion-trigger signal comprises a transition from within a pre-defined threshold band to outside of the pre-defined threshold band, wherein the pre-defined threshold band comprises a range of physical movement along the first characteristic and the second characteristic; and
the motion-confirm signal is within the pre-defined threshold band;
by the computing device, when the motion-trigger signal comprises the transition from within the pre-defined threshold band to outside of the pre-defined threshold band and the motion-confirm signal is within the pre-defined threshold band, initiating a pre-defined action of the computing device, wherein the pre-defined action is associated with the first characteristic and not associated with the second characteristic; and by the computing device, when the motion-trigger signal comprises the transition from within the pre-defined threshold band to outside of the pre-defined threshold band and the motion-confirm signal is outside the pre-defined threshold band, preventing initiation of the pre-defined action.

2. The method of claim 1, wherein the sensor comprises one or more accelerometer, gyroscope, or magnetometer.

3. The method of claim 1, wherein:
the first characteristic of the physical movement comprises an acceleration of the computing device along an axis perpendicular to a front surface of the computing device; and
the second characteristic of the physical movement comprises a rolling or yawing rotational motion of the computing device.

4. The method of claim 1, wherein:
the physical movement of the computing device comprises a sudden acceleration followed by a sudden deceleration along an axis perpendicular to a front surface of the computing device; and
the pre-defined action comprises zooming into or out of an image displayed by the computing device.

5. The method of claim 1, wherein:
the motion-trigger signal comprises data from an accelerometer; and
the motion-confirm signal comprises data from a gyroscope.

6. The method of claim 1, further comprising processing the sensor data by one or more low-pass filters to reduce noise.

7. The method of claim 1, wherein preventing initiation of the pre-defined action comprises performing a peak-hold that persists for a predetermined period of time on the motion-confirm signal so that an action lock-out condition persists for at least the predetermined period of time when the motion-confirm signal is outside of the pre-defined threshold band.

8. The method of claim 1, wherein the method further comprises:
computing a probability that the motion-trigger signal will comprise a transition from within the pre-defined threshold to outside of the pre-defined threshold band; and
initiating the pre-defined action of the computing device comprises only partially initiating the pre-defined action if the probability exceeds a pre-determined value.

9. The method of claim 8, wherein:
the pre-defined action comprises zooming into an image displayed by the computing device; and
the partially initiating the pre-defined action comprises partially zooming into the image.

10. The method of claim 1, wherein the speed with which the pre-defined action is performed is proportional to the amplitude of the motion-trigger signal.

11. The method of claim 1, wherein the computing device is a smartphone.

12. One or more computer-readable non-transitory storage media embodying software that is operable when executed to:
receive sensor data from a sensor on a computing device indicating physical movement of the computing device over a period of time;
determine, based on the sensor data, two contemporaneous signals comprising:
a motion-trigger signal corresponding to a first characteristic of the physical movement of the computing device; and
a motion-confirm signal corresponding to a second characteristic of the physical movement of the computing device;
determine whether:
the motion-trigger signal comprises a transition from within a pre-defined threshold band to outside of the pre-defined threshold band, wherein the pre-defined threshold band comprises a range of physical movement along the first characteristic and the second characteristic; and
the motion-confirm signal is within the pre-defined threshold band;
when the motion-trigger signal comprises the transition from within the pre-defined threshold band to outside of the pre-defined threshold band and the motion-confirm signal is within the pre-defined threshold band, initiate a pre-defined action of the computing device, wherein the pre-defined action is associated with the first characteristic and not associated with the second characteristic; and
when the motion-trigger signal comprises the transition from within the pre-defined threshold band to outside of the pre-defined threshold band and the motion-confirm signal is outside the pre-defined threshold band, prevent initiation of the pre-defined action.

13. The media of claim 12, wherein the sensor comprises one or more accelerometer, gyroscope, or magnetometer.

14. The media of claim 12, wherein:
the first characteristic of the physical movement comprises an acceleration of the computing device along an axis perpendicular to a front surface of the computing device; and
the second characteristic of the physical movement comprises a rolling or yawing rotational motion of the computing device.

15. The media of claim 12, wherein:
the physical movement of the computing device comprises a sudden acceleration followed by a sudden deceleration along an axis perpendicular to a front surface of the computing device; and
the pre-defined action comprises zooming into or out of an image displayed by the computing device.

16. The media of claim 12, wherein:
the motion-trigger signal comprises data from an accelerometer; and
the motion-confirm signal comprises data from a gyroscope.

17. The media of claim 12, wherein the software is further operable when executed to process the sensor data by one or more low-pass filters to reduce noise.

18. The media of claim 12, wherein preventing initiation of the pre-defined action comprises performing a peak-hold that persists for a predetermined period of time on the motion-confirm signal so that an action lock-out condition persists for at least the predetermined period of time when the motion-confirm signal is outside of the pre-defined threshold band.

19. The media of claim 12, wherein the software is further operable when executed to:
compute a probability that the motion-trigger signal will comprise a transition from within the pre-defined threshold to outside of the pre-defined threshold band; and initiate the pre-defined action of the computing device comprises only partially initiating the pre-defined action if the probability exceeds a pre-determined value.

20. A system comprising:

one or more processors; and a memory coupled to the processors comprising instructions executable by the processors, the processors being operable when executing the instructions to:

receive sensor data from a sensor on a computing device indicating physical movement of the computing device over a period of time;

determine, based on the sensor data, two contemporaneous signals comprising:

a motion-trigger signal corresponding to a first characteristic of the physical movement of the computing device; and a motion-confirm signal corresponding to a second characteristic of the physical movement of the computing device;

determine whether:

the motion-trigger signal comprises a transition from within a pre-defined threshold band to outside of the pre-defined threshold band, wherein the pre-defined threshold band comprises a range of physical movement along the first characteristic and the second characteristic; and the motion-confirm signal is within the pre-defined threshold band;

when the motion-trigger signal comprises the transition from within the pre-defined threshold band to outside of the pre-defined threshold band and the motion-confirm signal is within the pre-defined threshold band, initiate a pre-defined action of the computing device, wherein the pre-defined action is associated with the first characteristic and not associated with the second characteristic; and when the motion-trigger signal comprises the transition from within the pre-defined threshold band to outside of the pre-defined threshold band and the motion-confirm signal is outside the pre-defined threshold band, prevent initiation of the pre-defined action.

* * * * *